US010552863B1

(12) United States Patent
Sadagopan et al.

(10) Patent No.: US 10,552,863 B1
(45) Date of Patent: Feb. 4, 2020

(54) MACHINE LEARNING APPROACH FOR CAUSAL EFFECT ESTIMATION

(71) Applicant: Amazon Technologies, Inc., Seattle, WA (US)

(72) Inventors: Narayanan Sadagopan, Fremont, CA (US); Neela Kamlakar Sawant, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 15/353,665

(22) Filed: Nov. 16, 2016

(51) Int. Cl.
*G06Q 30/02* (2012.01)
*G06N 20/00* (2019.01)

(52) U.S. Cl.
CPC ......... *G06Q 30/0244* (2013.01); *G06N 20/00* (2019.01)

(58) Field of Classification Search
CPC .................. G06Q 30/0244; G06N 99/005
USPC .................................................. 705/14.43
See application file for complete search history.

(56) References Cited

FOREIGN PATENT DOCUMENTS

CN  104935496 A  * 9/2015

OTHER PUBLICATIONS

Susan Athey, Machine Learning Methods for Estimating Heterogeneous Causal Effects, 2015 (Year: 2015).*
Athey, S. et al., Machine Learning Methods for Estimating Heterogeneous Causal Effects, arXiv preprint arXiv:1504.01132v1, Apr. 2015, in 25 pages.
Bottou, L. et al., Counterfactual Reasoning and Learning Systems: The Example of Computational Advertising, JMLR, vol. 14(1), Nov. 2013, pp. 3207-3260.
Dudik, M. et al., Doubly Robust Policy Evaluation and Learning, Cornell University Library, arXiv:1103.4601v2, May 2011, in 9 pages.
Imbens, G. et al., Causal Inference for Statistics, Social, and Biomedical Sciences: An Introduction, Cambridge University Press, New York, NY, USA, Apr. 2015, Table of Contents.
Li, L. et al., An Unbiased Offline Evaluation of Contextual Bandit Algorithms with Generalized Linear Models, JMLR: Workshop and Conference Proceedings, Jul. 2012, vol. 26, pp. 19-36.
Rubin, Donald B., Estimating causal effects of treatments in randomized and nonrandomized studies, Journal of Educational Psychology, 66(5), 1974, pp. 688-701.

* cited by examiner

*Primary Examiner* — Tarek Elchanti
(74) *Attorney, Agent, or Firm* — Knobbe, Martens, Olson & Bear, LLP (57) ABSTRACT

Systems and methods are provided for optimizing campaigns (such as marketing campaigns) based on both short term and long term behaviors of users. A computing system learns an incremental outcome prediction model using training data comprising a marketing campaign log entry of a subject user and another marketing campaign log entry of a corresponding user, which represents a counterfactual outcome for the subject user. A marketing campaign can be selected for another user using the learned model.

20 Claims, 5 Drawing Sheets

MACHINE LEARNING APPROACH FOR CAUSAL EFFECT ESTIMATION

BACKGROUND

In statistics, a "multi-armed bandit" problem (referencing the "one-armed bandit" term used for a slot machine) consists of determining which one of multiple "arms" or levers to select in each of a series of trials, where each lever provides a reward drawn from a distribution associated with that specific lever. The objective is generally to maximize the total reward earned through a sequence of pulls of the levers. Generally, one has no initial knowledge about the levers prior to the first trial. The decision of which lever to select at each trial involves a tradeoff between "exploitation" of the lever that has the highest expected reward based on previous trials, and "exploration" to get more information about the expected reward of each lever. While various strategies have been developed to provide approximate solutions to versions of the multi-armed bandit problem, these solutions often have limited applicability to specific real world circumstances due to their reliance on certain constraints or assumptions regarding the underlying problem.

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as a machine learning model. A machine learning algorithm may be used to learn a machine learning model from training data. The parameters of a machine learning model may be learned in a process referred to as training. For example, the parameters or weight values of a machine learning model may be learned using training data, such as historical data that includes input data and the correct or preferred output of the model for the corresponding input data. A machine learning model may be used to compute predictions based on historical data.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to optimizing campaigns, such as marketing campaigns, based on both short term user behaviors (also referred to as relevance) and long term user behaviors in view of the multi-arm bandit problem. A short term user behavior can be, for example, selecting a message (such as a user selecting to view more information regarding an advertisement) and any transaction revenue that results from selecting the message. A long term user behavior can be, for example, the incremental effects of marketing campaigns on a user's future spending behavior, such as the downstream impact.

The long term user behavior may be a result of a "halo effect" of marketing campaigns that may result in additional engagement beyond short term behaviors. For example, a fashion-related advertisement may induce a user to purchase multiple accessories in addition to the advertised product. As another example, an advertisement featuring a video streaming benefit may lead the user to not only subscribe for a video streaming service but also to stream a video for the first time. The halo effect may potentially span a considerably longer time than a shopping session in some instances. For example, users who subscribe to a life stage program that targets mothers may have a higher likelihood of making repeat purchases in other product categories (such as baby products, healthcare, and groceries) relative to non-subscribers over many subsequent months. As such, optimizing future campaign allocation based on the joint analysis of short term user behaviors based on short-term relevance metrics (such as user selections and transaction revenue) and long term user behaviors based on a prediction of downstream incremental effect (also referred to as causal effect) can be important.

To perform such optimization, the incremental effects of historical campaigns can be estimated using causal inference methods. The outcome of when a marketing campaign has targeted a particular user in the past can be recorded and known. A counterfactual outcome (what would have been) if a different marketing campaign or no marketing campaign had targeted the user can be estimated. However, knowing the exact ground truth for the counterfactual outcome can be impossible because the true incremental effect cannot be measured directly. By estimating the counterfactual outcome, the incremental effects of historical campaigns can be estimated. Furthermore, after the incremental effects of historical campaigns have been estimated, the incremental effect of future campaigns when presented to potentially new user groups can be predicted. The incremental outcome prediction model disclosed herein can be used to measure and predict the incremental effect of marketing campaigns as well as to optimize future campaign allocation in a joint analysis with relevance metrics. In some embodiments, the incremental outcome prediction model can be based on Thompson sampling. For example, sampling of a marketing campaign for a user can be in proportion to the marketing campaign being optimal of the user.

Advantageously, incremental effects or long term behaviors can be measured more granularly at the context level, rather than at the user level or the action level. Furthermore, the incremental outcome prediction model may be based on long term user behaviors (such as long term revenue), and thus not necessarily rely on modeling conversions in an intermediate step. Thus, the model is not limited to mapping one campaign to one user behavior. In addition, the training data for the incremental outcome prediction model, generated based on off-policy policy evaluation, does not require explicit random data collection. Accordingly, training data can be generated even if obtaining true control or holdout segments is difficult. For example, with campaign substitution effects, a control user for a particular campaign may end up being targeted by exogenous targeting systems. The model is also highly scalable because multiple campaigns can be modeled together.

Figure 1:
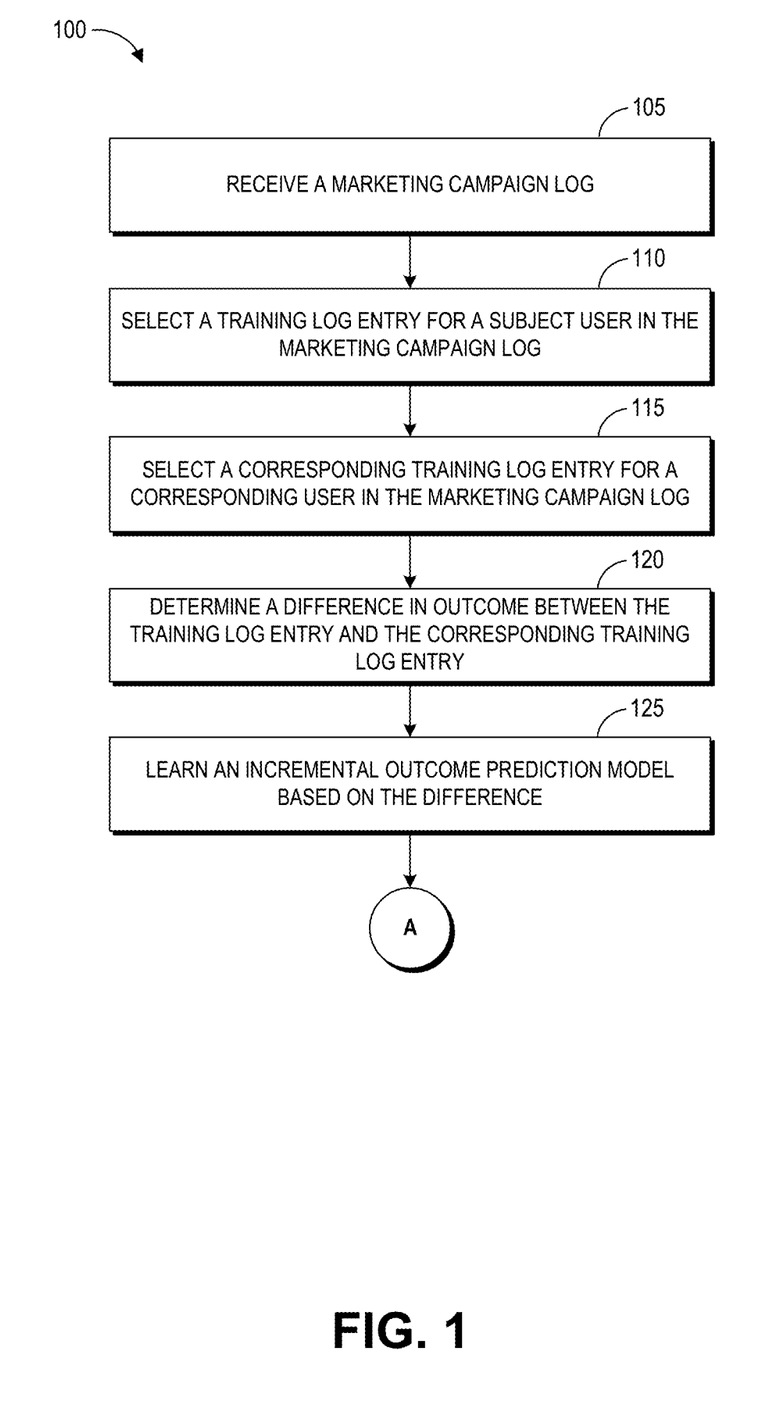
FIG. 1 is a flow diagram depicting an illustrative method for learning an incremental outcome prediction model.

FIG. 1 is a flow diagram depicting an illustrative method 100 for learning an incremental outcome prediction model. The method 100 may be embodied in a set of executable program instructions stored on a computer-readable medium, such as one or more disk drives, of a computing system, such as the computing system 500 shown in FIG. 5 and described in greater detail below. When the method 100 is initiated, the executable program instructions may be loaded into memory, such as RAM, and executed by one or more processors of the computing system 500. Although the method 100 is described with respect to the computing system 500 shown in FIG. 5, the description is illustrative only and is not intended to be limiting. In some embodiments, the process 100 or portions thereof may be performed serially or in parallel by multiple computing systems.

The illustrative method begins at block 105, where the computing system 500 may receive a marketing campaign log. The marketing campaign blog can include a plurality M of log entries L for users. As discussed in greater detail below, a log entry for a user m can indicate that a user with a context X (for example, user features) having been shown a message (for example, an email communication, or an advertisement) of a marketing campaign W. Thus incremental effects or long term behaviors can be measured more granularly at the context level, rather than at the user level or the action level.

The log entry can include a probability S of any message of the marketing campaign being displayed to the user. The log entry can include an observed long term behavior $Y^{(obs)}$ of the user, which can include an incremental value (such as an increase in transaction revenue or user spending), engagement, or conversion of the user between a short term time threshold t (for example, one day) and the long term time threshold t+T (for example, one month) after a message of the campaign is shown to the user.

At block 110, the computing system 500 may select a training log entry for a subject user in the marketing campaign log. As discussed above, the log entry can indicate a message (for example, an email communication, or an advertisement) of a marketing campaign having been shown to the subject user having a given context. The training log entry can include a probability of any message of the marketing campaign being displayed to the subject user.

The training log entry can also include an observed short term behavior of the subject user and/or an observed long term behavior of the subject user. In some embodiments, the observed short term behavior of the first subject user can include an observed selection by the subject user of a displayed first message of the first marketing campaign during a browsing session (such as the user using a cursor or touchscreen input to select a displayed advertisement in order to request more information regarding the subject of the advertisement, or to purchase an advertised item). In some embodiments, the observed short term behavior of the subject user can include an increase in short term value (such as transaction revenue) from the subject user within a short term time threshold after displaying the first marketing campaign to the subject user. The short term time threshold can be, for example, 30 minutes, one hour, one day, or more.

The observed short term behavior of the subject user and/or the observed long term behavior of the subject user can be normalized. For example, the observed long term behavior of the subject user can be normalized based on the probability of the message of the marketing campaign being selected to be received by the first subject user. The probability can be estimated using a Thompson sampling procedure, which can ensure that different marketing campaigns may be served to users with similar contexts with a non-zero probability.

In some embodiments, the observed long term behavior $Y^{(obs)}$ of the subject user can include an incremental value (such as an increase in transaction revenue or user spending), engagement, or conversion of the subject user between a short term time threshold t (for example, one day) and the long term time threshold t+T (for example, one month) after a message of the campaign is shown to the subject user. For example, the observed long term behavior of the subject user can include an increase in the user's spending between the short term time threshold and the long term time threshold. The long term time threshold can be, for example, one week, one month, or more. As another example, the observed long term behavior of the subject user can include an increase in transaction value between one week and one month after the message of the marketing campaign being shown to the subject user.

The observed short term behavior of the subject user and/or the observed long term behavior of the subject user can each be either a discrete behavior or a continuous behavior. The discrete behavior can be, for example, whether or not the subject user has purchased an item or a product (for example, a book or an electronic device) or subscribed to a service (for example, a video or audio streaming service or a life stage service) promoted by the marketing campaign. The continuous behavior can be, for example, an increase in the value of products purchased or services subscribed to. The marketing campaign can be designed to promote the products purchases or services subscribed to. The marketing campaign and its one or more messages can be designed for a product, item, or service of interest to the subject user.

The training log entry can include a context of the subject user. The user context of the training log entry can include at least one of a user feature, a marketing channel, a user device type, a time, or a day. The user context can include user features or a user identifier which can be used to look up offline or real-time features such as propensity scores and session activity. Alternatively or in addition, the user context can include environment features such as channel, device, time of the day, day of the week, etc. The context can determine the type of items, products, or services that are be marketed to the subject user. For example, existing users of a subscription service may be filtered out from receiving marketing campaigns for the same subscription service. Furthermore, the context can affect the estimation of the short term behavior and the long term behavior, such as user-level downstream impact in user spending (DSI) forecasts and channel-attributed transaction revenue estimates.

At block 115, the computing system 500 may select a corresponding training log entry for a corresponding user in the marketing campaign log. The corresponding user may be a user other than the subject user referred to above in block 110, who is similar to the subject user. The training log entry and the corresponding training log entry can be in the same format or can include similar information. Briefly, the corresponding training log entry for the corresponding user m can indicate that the corresponding user m' with a context X' (for example, user features) having been shown a message (for example, an email communication, or an advertisement) of another marketing campaign W'. However, the corresponding user may have been additionally shown a message of a marketing campaign not in the plurality of marketing campaigns under consideration. Advantageously, explicit random data collection may not be necessary. By learning using data of multiple campaigns, the model can be highly scalable.

The log entry can include a probability S' of any message of the other marketing campaign being displayed to the corresponding user. The log entry can include an observed long term behavior $Y'^{(obs)}$ of the corresponding user, which can include an incremental value (such as an increase in transaction revenue or user spending), engagement, or conversion of the corresponding user between a short term time threshold t (for example, one day) and the long term time threshold t+T (for example, one month) after a message of the campaign is shown to the corresponding user.

The context of the subject user and the context of the corresponding user can be within a threshold distance in a context space including the two contexts. The corresponding training log entry can be selected using a context matching algorithm $\Phi$ (described with reference to Table 1 in greater detail below), which can be based on at least one of a nearest neighbor method, a locality sensitive hashing method, or a propensity matching method. Using the context matching method to select the corresponding training log entry can reduce variance.

The marketing campaign with a message shown to the subject user in block 110 and the other marketing campaign with a message shown to the corresponding user in block 115 can be different. The two marketing campaigns can be selected from a plurality of marketing campaigns. The corresponding training log entry for the corresponding user can correspond to a counterfactual outcome for the subject user. In contrast to the subject user being shown a message of a particular marketing campaign, the corresponding user has not been shown any message of the particular marketing campaign for the subject user. The corresponding user may be shown a message of a different marketing campaign or no marketing campaign at all (also referred to as a null marketing campaign).

At block 120, the computing system 500 may determine a difference in outcome between the training log entry and the corresponding training log entry. The difference in outcome between the two training log entries can include a difference between the observed short term behaviors of the two users. Alternatively or in addition, the difference in outcome between the two training log entries can include a difference between the observed long term behaviors of the two users. The difference in outcome between the two training log entries can be the biggest difference between the observed long term behavior of the subject user in the training log entry and any observed long term behaviors of the corresponding user in the corresponding training log entry. The difference in outcome between the two observed long term behaviors can be normalized. The difference in outcome between the observed short term behavior and the observed long term behavior can be weighted differently in different implementations based on the desire in changing the user's short term or long term behaviors. For example, the weights may be determined empirically and with business heuristics. The selection probability can be determined using a Bayesian linear probit (BLIP) model, in one embodiment. The revenue estimates (transactional as well as long term) can be determined using Bayesian linear regression (BLIR) models, in one embodiment.

The process of selecting a training log entry for a subject user and a corresponding training log entry for a corresponding user representing a counterfactual outcome for the user can be referred to as generating training data. Table 1 is a summary of training data generation using a nearest neighbor method. At the beginning of training data generation, the set of training data can be an empty set $T_0$. For each log entry m of the M log entries of a marketing campaign log L, the computing system 500 may select a log entry for a user with a context $X_m$. The log entry m for the user can indicate that the user with a context $X_m$ (for example, user features) has been shown a message (for example, an email communication, or an advertisement) of a marketing campaign $W_m$. The log entry m can include a probability $S_m$ of any message of the marketing campaign $W_m$ being displayed to the user. The log entry m can include an observed long term behavior $Y_m^{(obs)}$ of the user, such as an increase in transaction revenue between a short term time threshold t (for example, one day) and the long term time threshold t+T (for example, one month) after the message of the campaign $W_m$ is shown to the user. The observed long term behavior $Y_m^{(obs)}$ can be normalized with the probability $S_m$ of any message of the marketing campaign $W_m$ being displayed to the user to generate a policy bias-corrected treatment or campaign outcome $Y_m^{(tr)}$.

After initializing the counterfactual long term behavior $Y_m^{(cf)}$ to zero, M' number of nearest neighbor log entries m' of the log entry m in the marketing campaign log L can be selected based on the distance between the context $X_m$ of the log entry m and the context $X_{m'}$ of the nearest neighbor m'. Each nearest neighbor log entry m' can indicate that the user with a context $X_{m'}$ has been shown a message of another marketing campaign $W_{m'}$. The log entry m' can include a probability $S_{m'}$ of any message of the marketing campaign $W_{m'}$ being displayed to the user. The log entry m' can include an observed long term behavior $Y_{m'}^{(obs)}$ of the user. The observed long term behavior $Y_{m'}^{(obs)}$ can be normalized with the probability $S_{m'}$ of any message of the marketing campaign $W_{m'}$ being displayed to the user. This normalized observed long term behavior $Y_{m'}^{(obs)}/S_{m'}$ can be added to the counterfactual long term behavior $Y_m^{(cf)}$ being estimated. In addition, the training data for the incremental outcome prediction model, generated based on off-policy policy evaluation, does not require explicit random data collection.

This procedure for generating training data can be referred to as off-policy policy evaluation. Each nearest neighbor log entry m' can indicate that the user with the context $X_{m'}$ has been shown a message of another marketing campaign $W_{m'}$ other than the marketing campaign $W_m$. However, this other user with the context $X_{m'}$ may have received a message of a marketing campaign not among the plurality of marketing campaigns under consideration. Thus, training data can be generated even if obtaining true control or holdout segments is difficult. For example, with campaign substitution effects, a control user for a particular campaign may end up being targeted by exogenous targeting systems.

The counterfactual long term behavior $Y_m^{(cf)}$ can be normalized by the number of M' number of nearest neighbor log entries m' of the log entry m in the marketing campaign log L. An unbiased revenue difference target $Y_m^{(*)}$ for a user with the context $X_m$ can be estimated based on the difference between the policy bias-corrected treatment or campaign outcome $Y_m^{(tr)}$ and the estimated counterfactual long term behavior $Y_m^{(cf)}$. Training data $T_k$ can be updated to include the triplet of the context $X_m$ of the log entry m, the marketing campaign $W_m$ with a message shown to the user with the context $X_m$, and the unbiased revenue difference target $Y_m(*)$ for the user with the context $X_m$.

Table 1. Training Data Generation
$T_0 \leftarrow \emptyset$ [An initially empty training data set]
For m=1 to M do
    Sample log entry $(X_m, W_m, S_m, Y_m^{(obs)})$ from L.
    $Y_m^{(tr)} \leftarrow Y_m^{(obs)}/S_m$ [Apply policy bias correction to observed long term behavior]
    $Y_m^{(cf)} \leftarrow 0$ [Initialize counterfactual long term behavior (for example, revenue) to zero]
    Select M' nearest neighbors using $\Phi(X_m, X_{m'})$
    For m'=1 to M' do
        Select log entry $(X_{m'}, W_{m'}, S_{m'}, Y_{m'}^{(obs)'})$ from L such that $W_{m'} \neq W_m$, $Y_m^{(cf)} \leftarrow Y_m^{(cf)} + Y_{m'}^{(obs)}/S_{m'}$
    end for
    $Y_m^{(cf)} \leftarrow Y_m^{(cf)}/M'$ [Final counterfactual estimate after normalization]
    $Y_m^{(*)} \leftarrow Y_m^{(tr)} - Y_m^{(cf)}$ [Unbiased long term behavior difference target]
    $T_k \leftarrow$ CONCATENATE $(T_{k-1}, (X_m, W_m, Y_m^*))$
end for At block 125, the computing system 500 may learn an incremental outcome prediction model based at least in part on the difference between the two log entries. For example, the incremental outcome prediction model can be learned based at least on the difference between the observed long term behavior of the user and the observed long term behavior of the corresponding user. Once the training data has been generated, an incremental outcome prediction model can be learned by directly modeling the unit-level incremental effect $Y_k^* = Y_k^{(tr)} - Y_k^{(cf)}$ as $$\hat{\tau}_k(x) = [E(Y \mid X_i = x, W_i = k) - E(Y \mid X_i = x, W_i \neq k)] = \qquad \text{Eq. (1)}$$
$$E(Y_k^* \mid X = x, W_i = k),$$

where $E(\cdot)$ denotes an expectation value, and $Y_k^{(tr)}$ and $Y_k^{(cf)}$ denote the potential outcomes of $W_i = k$ and $W_i \neq k$. Equation (1) resembles down-stream impact on the revenue Y from a single marketing campaign in relation to all other marketing campaigns.

The incremental model does not require determining an intermediate propensity and integrating over the possible event (e.g., displaying a message of a campaign) universe. The number of prediction models for the method disclosed herein may be O(1). In contrast, the number of prediction models for other methods may be O(A) for some applications and O(AN) for channel-specific models, where A denotes the number of marketable actions and N denotes the number of channels. Thus, an incremental outcome prediction model can be computationally more efficient than other models.

Figure 2:
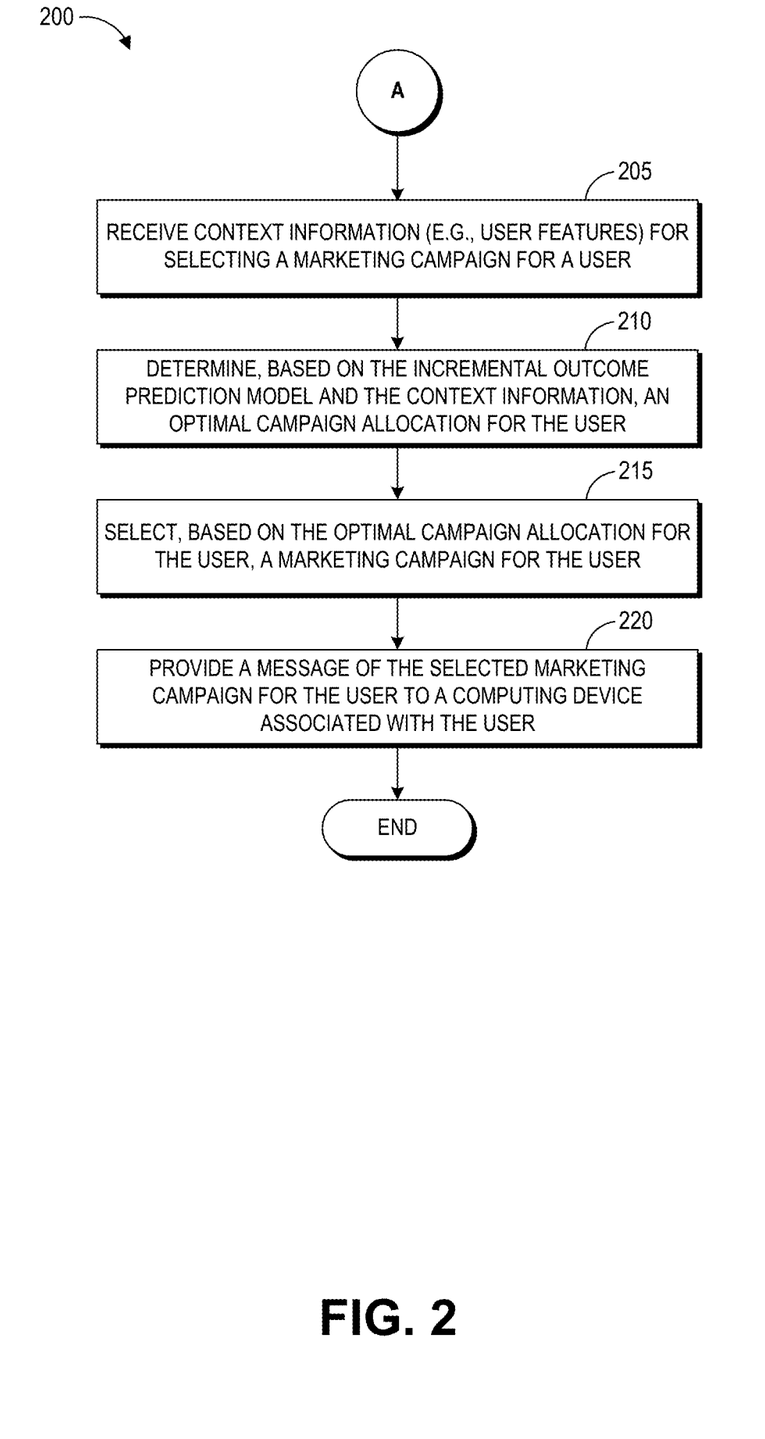
FIG. 2 is a flow diagram depicting an illustrative method for using an incremental outcome prediction model to optimize marketing campaigns.

FIG. 2 is a flow diagram depicting an illustrative method for using an incremental outcome prediction model to optimize marketing campaigns. The process 200 may be embodied in a set of executable program instructions stored on a computer-readable medium, such as one or more disk drives, of a computing system, such as the computing system 500 shown in FIG. 5 and described in greater detail below. When the process 200 is initiated, the executable program instructions may be loaded into memory, such as RAM, and executed by one or more processors of the computing system 500. Although the process 200 is described with respect to the computing system 500 shown in FIG. 5, the description is illustrative only and is not intended to be limiting. In some embodiments, the process 200 or portions thereof may be performed serially or in parallel by multiple computing systems.

The illustrative method 200 may be implemented following implementation of method 100, discussed above, such that block 205 occurs subsequent to block 125 described above. At block 205, the computing system 500 may receive context information of a user for selecting a marketing campaign for the user. For example, the context information for selecting a marketing campaign for the user can include user features, such as the user's prior purchasing behaviors and the user's prior observed short term and long term behavior after a message of a campaign is shown to the user. The context information of the user received can be determined at a time immediately prior to it being received, such that the context information is up-to-date for the user. The context information of the user can also include context information of the marketing campaign (for example, the types of messages of the marketing campaigns, such as the communication channels for the messages employed by the marketing campaign) shown to the user previously.

At block 210, the computing system 500 may determine, based on the incremental outcome prediction model (for example, the incremental outcome prediction model learned at block 125 in FIG. 1) and the context information, an optimal campaign allocation for the user. The optimal campaign allocation for the user can include a probability distribution of selection criteria for a plurality of available marketing campaigns.

At block 215, the computing system 500 may select, based on the optimal campaign allocation for the user, a marketing campaign for the user from among the plurality of marketing campaigns. The plurality of marketing campaigns can include a null marketing campaign. The null marketing campaign includes no message. If the null marketing campaign is selected for the user, no message is shown to the user (other than perhaps messages from marketing campaigns that are not from among the plurality of marketing campaigns being considered). The user referenced in FIG. 2 can be the same as or different from the users referenced in block 110 and block 115 of FIG. 1. The marketing campaign selected for the user can be the same as or different from the marketing campaigns in block 110 or block 115 of FIG. 1.

At block 220, the computing system 500 may provide a message (for example, an advertisement or an email communication) of the selected marketing campaign for the user to a computing device associated with the user. For example, the message may be displayed to the computing device associated with the user during a browsing session, via an application executed by the mobile computing device (such as via a push notification), as an email, as a text message, and/or in other manners. In some embodiments, the computing system 500 may provide the incremental outcome prediction model to a recommendation service. The recommendation service can in turn determine, based on the context of the user, a marketing campaign selected from among the plurality of marketing campaigns. After the recommendation service provides a message of the marketing campaign to an application (such as an electronic commerce website), the message can be shown to a computing device associated with the user. The computing system 500 may provide the user with the recommendation directly or indirectly through an application or service, such as an electronic catalog of an electronic commerce website.

Figure 3:
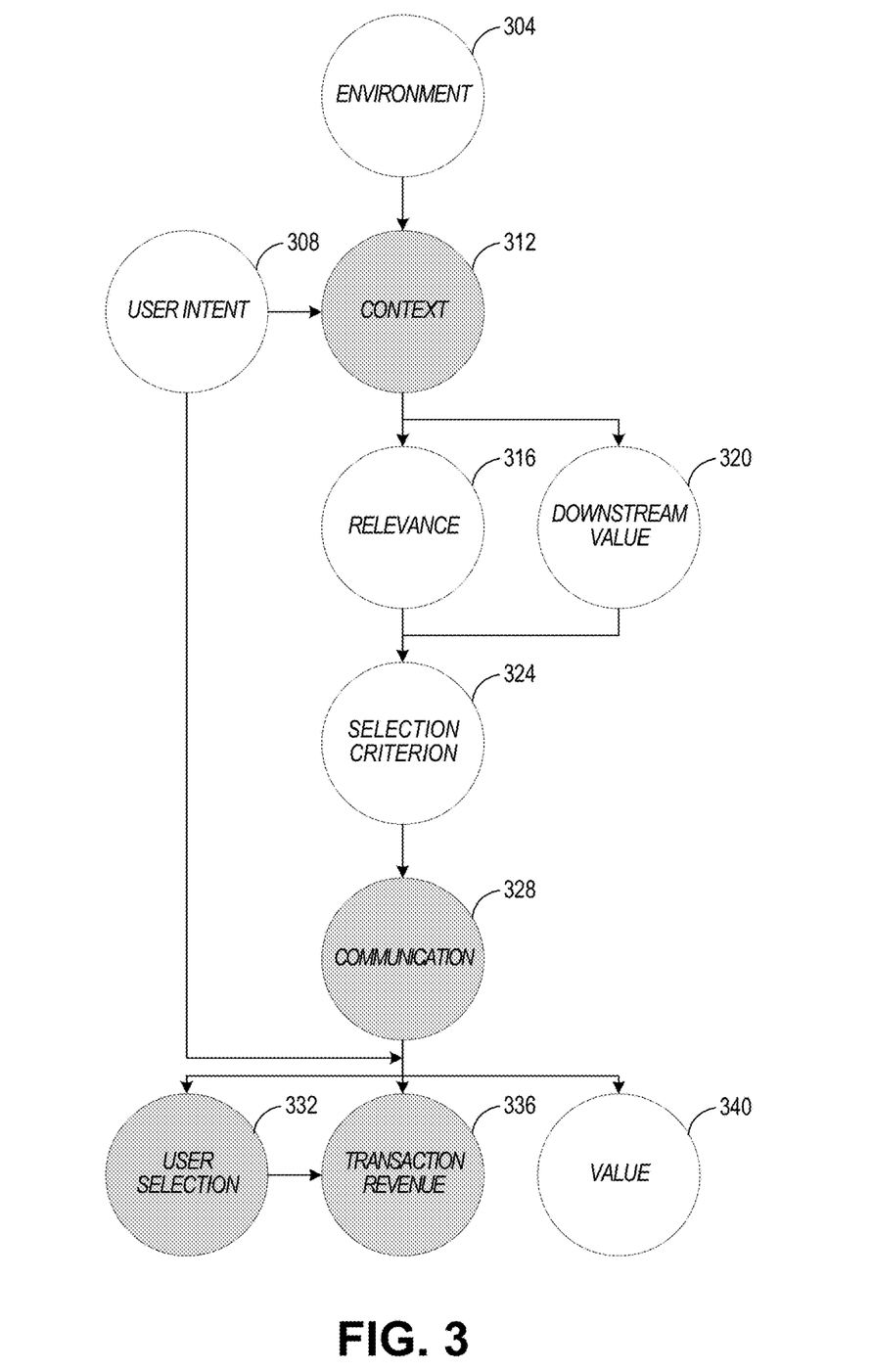
FIG. 3 is a schematic illustration of a Bayesian marketing campaign optimization framework.

FIG. 3 is a schematic illustration of a Bayesian marketing campaign optimization framework. A user context 312 can include, for example, user features or a user identifier which can be used to look up offline or real-time features, such as propensity scores and session activity. In some instances, the user context 312 can include environment features such as channel, device, time of the day, day of the week, etc. The user context 312 may be affected by the user's intent 308. The user's intent 308 may not be directly observable. The user context 312 can also be affected by the environment 304 in which the user interacts with marketing campaigns.

The user context 312 affects the relevance 316 of each of the plurality of marketing campaigns. The relevance 316 can be based on the user's short term behavior, such as selection of a message of a marketing campaign or resulting transaction revenue after the selection of the marketing campaign. For example, the user context 312 may affect the estimation of the short term behavior. The user context 312 also affects a downstream impact in user spending (DSI). For example, the user context 312 may result in an increase in user spending between one week and one month after a message of the marketing campaign is shown to the user.

A plurality of selection criteria 324 can be determined based on the joint optimization of relevance 316 and downstream value 320. A selection criterion can be based on a sampling method, such as Thompson sampling. For example, a marketing campaign may be selected for the user in proportion of the marketing campaign being "optimal" for the user with respect to the joint optimization of relevance 316 and downstream value 320. The goal of the campaign optimization framework may be to determine an optimal campaign allocation that is user-level, context-aware, relevant, as well as incremental in the long term. An optimal campaign allocation can be determined using the function F in Equation (2):

$$F(W,X) : \beta \cdot \Pr(C=1|W) \cdot E(R|X,W,C=1) + (1-\beta) \cdot E(Y^*|X, W), \quad \text{Eq. (2)}$$

where W denotes one of the plurality of available marketing campaigns for selection, X denotes the user context, $\beta$ is a number between 0 and 1, $\Pr(C=1|W)$ denotes the probability of a user selection (C=1) of a message of the marketing campaign W shown to the user, $E(R|X, W, C=1)$ denotes the expected relevance R given the marketing campaign W the user context W and user selection (C=1), and $E(Y^*|X, W)$ denotes the expected incremental long term revenue $Y^*$ given the marketing campaign W and the user context W.

In Equation (2), relevance R and long term incremental revenue $Y^*$ are combined using a convex combination of weights. If $\beta=0$, the marketing campaigns are optimized only with respect to long term incremental effect. If $\beta=1$, the marketing campaigns are optimized using a contextual bandit paradigm. The value of $\beta$ may be determined empirically and/or with business heuristics. The selection probability can be determined using a Bayesian linear probit (BLIP) model, in some embodiments. The revenue estimates (transactional as well as long term) can be determined using Bayesian linear regression (BLIR) models, in some embodiments. A message for a marketing campaign for a user with a context x may be chosen in proportion to the sampling score S computed as:

$$S_m \propto \int_\theta \mathbb{I}_{\mathbb{E}(F|X=x,W=m,\theta)=\max_{m'} \mathbb{E}(F|X=x,W=m', \theta)} [p(\theta|D) d\theta] \quad \text{Eq. (3)}$$

In some embodiments, the sampling score can be determined as follows: A number of samples can be generated from the posterior distribution of model parameters $\theta$. Each of the parameter samples can be used to predict a selection, a transaction revenue estimation, and a long term incremental revenue estimation that can be combined using Eq. (2).

The number of times a campaign m resulted in the highest outcome can be determined. The resulting optimality distribution can be used to proportionately sample a message of the campaign for communicating with the user.

In some embodiments, the value of $\beta$ can be optimized for High Value Action Optimization (HVAO). High Value Actions (HVAs) or behaviors can refer to actions taken by users that lead to a high downstream impact in user spending (DSI). In one embodiment for one industry, these HVAs may include signing up for a subscription service, a first purchase in a product group, video streaming, or purchasing an electronic device (such as an electronic book reader). The objective of High Value Action Optimization (HVAO) can be to drive incremental high value actions by marketing relevant HVAs to a user via different channels. To jointly optimize for relevance and incremental effect, a framework may be instantiated with non-zero $\beta$ value. The context may include a user identifier, channel identifier, a device identifier, as well as time of day and/or day of the week. In some embodiments, the optimization can operate at the action level instead of a campaign level. Propensity score estimates and user-level DSI estimates may be provided as input to modeling relevance and long term incremental revenue.

In some embodiments, the value of $\beta$ can be optimized for identifying users likely to engage in certain types of actions or behaviors in the near future. This user-level optimization using the proposed framework can outperform a KOTH (King Of The Hill) algorithm. The KOTH algorithm can be used to perform campaign-level optimization by selecting one winning campaign resulting in highest revenue or user selections over the whole population. With $\beta=1$, the model can be optimized based on relevance (user selections and transaction revenue) alone. With $0<\beta<1$, the model can be optimized based on a trade-off between the relevance and halo effect or the downstream impact of marketing campaigns. The incremental effect framework may be particularly useful in this case because DSI estimates may not be available to distinguish campaigns within categories.

Based on the selection criteria 324, a marketing campaign can be selected for the user and a message of the selected marketing campaign communicated 328 to the user. For example, a message (such as an email communication or an advertisement) of the selected marketing campaign can be displayed 328 on an electronic device associated with the user.

Based on the message communicated 328 to the user and the user's intent 308, the user can respond to the message in the short term by, for example, selecting 332 the message displayed. The user can also respond to the message in the short term by purchasing an item, product, or service promoted by the message, which is associated with transaction revenue 336 (such as the price of the item or product purchased, or the service subscribed to). The message communicated 328 to the user and the user's intent 308 can affect the long term behavior of the user. The long term behavior of the user can include an increase in value 340 between a short term time threshold t (for example, one day) and the long term time threshold t+T (for example, one month) after the message of the campaign $W_m$ is shown to the user. The user context 312, the user section 332, and the transaction revenue 336 are shaded in FIG. 3 to indicate that they may be actually observed. The non-shaded blocks indicate that they may be estimated analytically or empirically.

Figure 4:
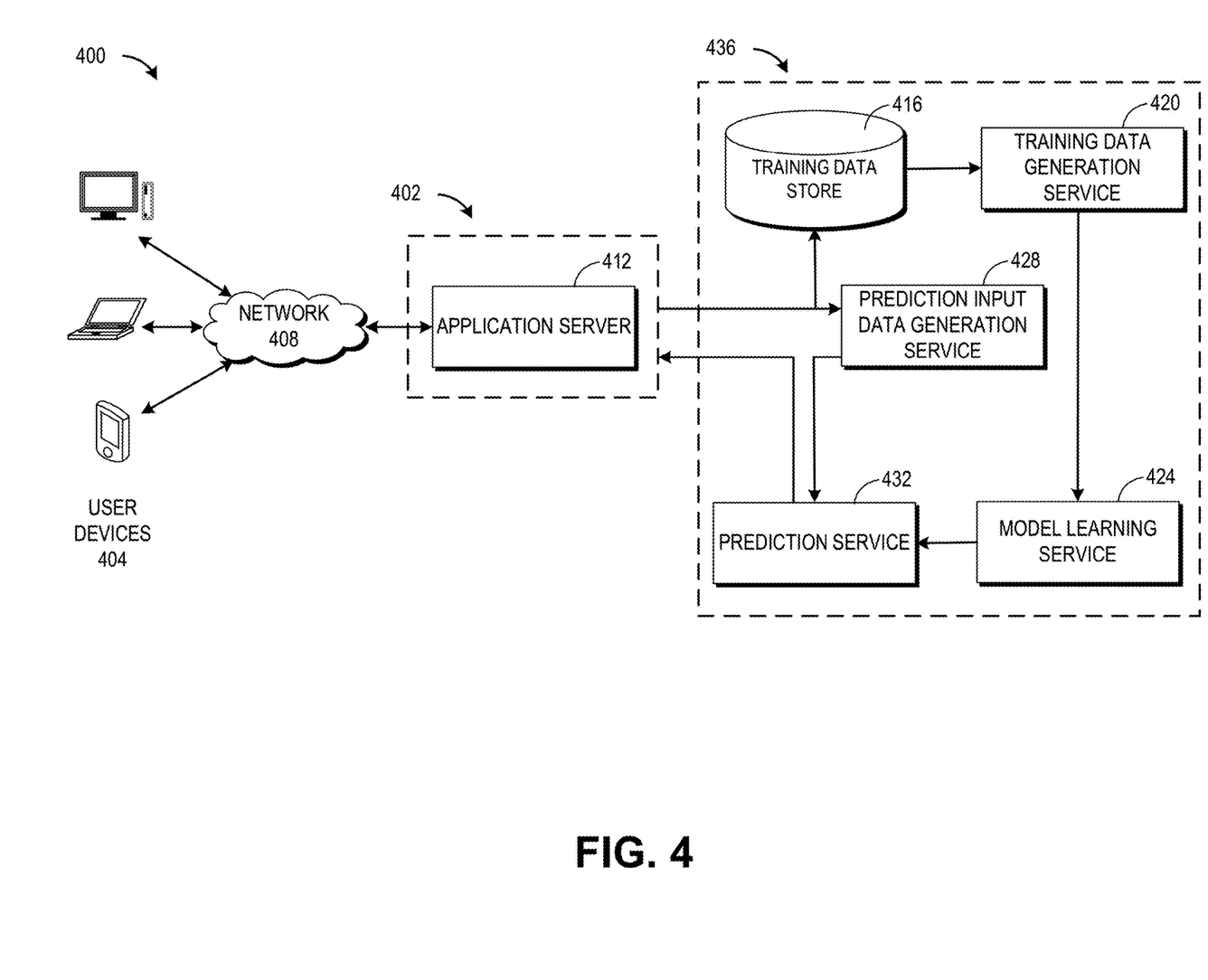
FIG. 4 is a block diagram depicting an illustrative operating environment for learning an outcome prediction model and generating predictions using the learned outcome prediction model.

FIG. 4 is a block diagram depicting an illustrative operating environment 400 for learning an outcome prediction model and generating predictions using the learned outcome prediction model. The illustrative operating environment 400 shown in FIG. 4 includes an electronic commerce system that enables users to browse items (such as items listed in an electronic catalog for purchase) using user devices 404 through a communication network 408. The electronic commerce system 404 may also provide users with recommendations. In some implementations, the computing system 402 may provide content streaming services to users. As will be appreciated, a retail service and/or a streaming service are simply provided as examples, as aspects of the present disclosure are applicable to a large number of other environments where predictions may be made using a machine learning model.

The electronic commerce system 402 may include an application server 412 (for example, a retail server, or a streaming server) that provides users with an electronic catalog of items for purchases. The application server 412 may facilitate electronic browsing and purchasing of items using various user devices, such as user computing devices 404 (which may alternatively be referred to herein as client computing devices), through the communication network 408. The application server 412 is generally responsible for providing front-end communication with various user devices, such as a user computing device 404, via the network 408. The front-end communication provided by the application server 412 may include generating text and/or graphics, possibly organized as a user interface using hypertext transfer or other protocols in response to information inquiries received from the various user devices 404.

User computing devices 404 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

In the environment 400 shown in FIG. 4, a user of the electronic commerce system 402 may utilize a user computing device 404 to communicate with the application server 412 (for example, a retail server) via the communication network 408, such as the Internet or other communications link. The network 408 may be any wired network, wireless network or combination thereof. In addition, the network 408 may be a personal area network, local area network, wide area network, cable network, satellite network, cellular telephone network, etc., or combination thereof. For example, the network 408 may be a publicly accessible network of linked networks, possibly operated by various distinct parties, such as the Internet. In some embodiments, the network 408 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 408 may use protocols and components for communicating via the Internet or any of the other aforementioned types of networks.

The application server 412 may be connected with or in communication with a training data store 416, which may store training data. Training data may include account information, purchase history, browsing history, item reviews and ratings, personal information, location information, billing information, and/or other information, depending on the embodiment. The training data store 416 may include information regarding users' previous actions, such as previous purchases, and previous marketing messages and communications the users have received. The application server 412 may provide indications of user actions with respect to the application server 412 and the marketing messages and communications received by users to the training data store 416.

In some embodiments, the training data store 416 may be local to the electronic commerce system 402, may be remote from the electronic commerce system 402, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium accessible to the application server 412 and/or a training data generation service 420. The data store 416 may also be distributed or partitioned across multiple local and/or storage devices, or combined into a single storage device, without departing from the spirit and scope of the present disclosure.

The training data generation service 420 may be connected to or in communication with the training data store 416. The training data generation service 420 may send instructions to the training data store 416 that provide the training data store 416 with the criteria for creating the training data. In some implementations, instead of providing the training data store 416 with the criteria for creating the training data, the training data generation service 420 may generate training data from the data received from the training data store 416. The training data generation service 420 may provide a model learning service 424 with training data, which the model learning service 424 may use to learn an incremental outcome prediction model. The model learning service 424 may provide the incremental outcome prediction model to a prediction service 432.

After observing a user action (such as item purchases, page views and/or other actions) of a user or a user account after the user or user account receives a message of a marketing campaign, the application server 412 may provide the observed user action with respect to the application server 412 and the marketing messages and communications received by the user or user account to a prediction input data generation service 432. The prediction input data generation service 428 may process the observed user action and the marketing messages and communications received by the user or user account into a format suitable for the prediction service 432 to determine, for the user or user account, an optimal campaign. The prediction service 432 can determine, for the user or user account, an optimal campaign based on the incremental outcome prediction model received from the model learning service 424 and processed observed user action received from the prediction input data generation service 428.

In some embodiments, training data generated by the training data generation service 420 and the data used in prediction processed by the prediction input data generation service 428 may be similarly formatted. For example, the training data and the processed observed user action may have the same level of granularity with respect to the products purchased or viewed, videos watched, music listened, or services subscribed to.

As depicted in FIG. 4, a prediction computing system 436 may implement the training data store 416, the training data generation service 420, the model learning service 424, the prediction input data generation service 428, and the prediction service 432. In some implementations, the data store 416 and the services may be components of one computing system. In other implementations, the prediction computing system 436 may operate in a distributed computing environment including several computer systems that are interconnected using one or more computer networks. The prediction computing system 436 could also operate within a computing environment having a fewer or greater number of devices or services than are illustrated in FIG. 4. Thus, the depiction of prediction computing system 436 in FIG. 4 should be taken as illustrative and not limiting to the present disclosure. For example, the prediction computing system 436 could implement various Web services components and/or peer-to-peer network configurations to implement at least a portion of the processes described herein.

Figure 5:
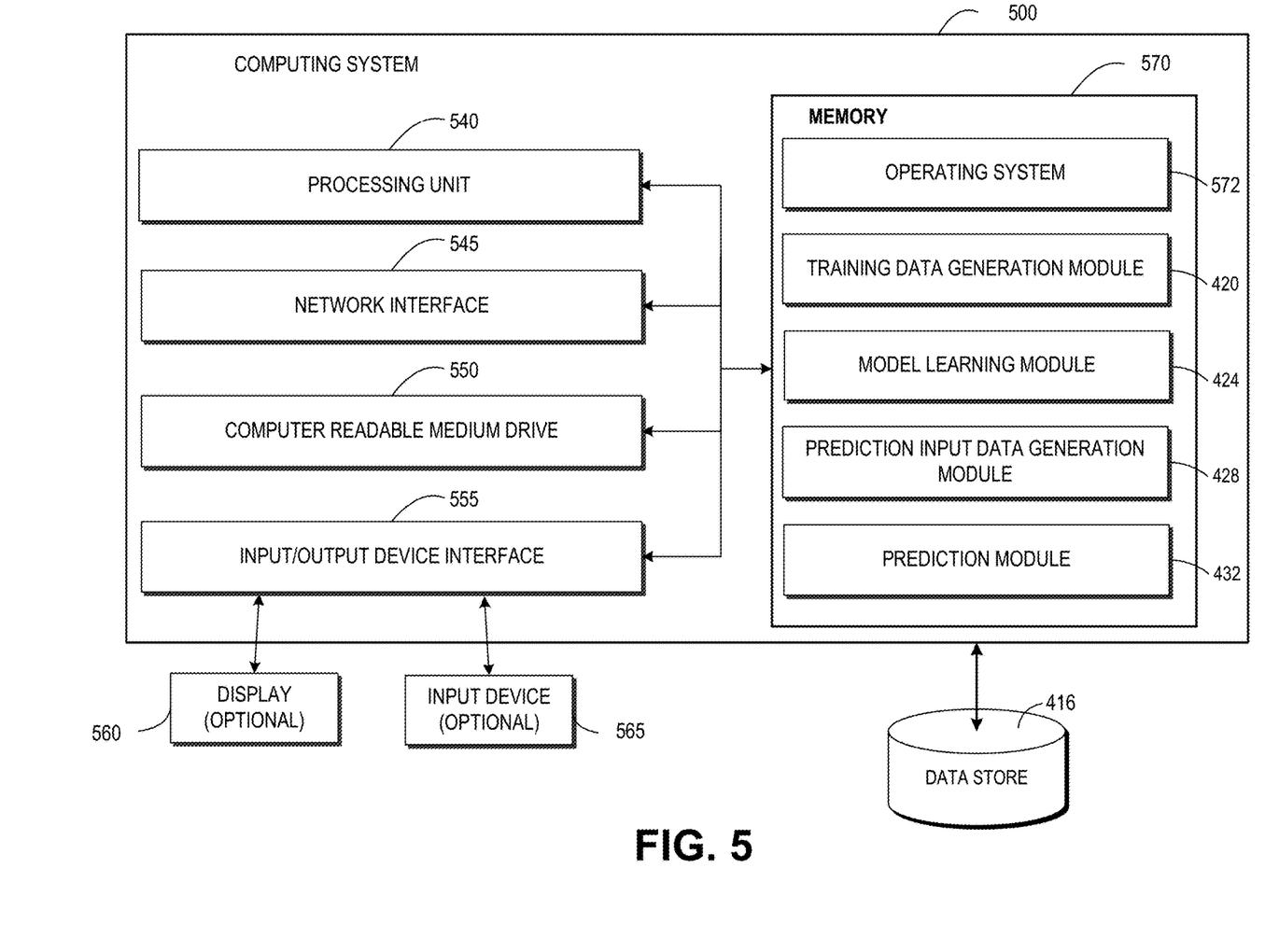
FIG. 5 depicts a general architecture of an example computing device configured to learn an outcome prediction model and generate a prediction result using the model.

FIG. 5 depicts a general architecture of an example computing device 500 configured to learn an outcome prediction model and generate a prediction result using the model. The general architecture of the computing device 500 depicted in FIG. 5 includes an arrangement of computer hardware and software components. The computing device 500 may include many more (or fewer) elements than those shown in FIG. 5. It is not necessary, however, that all of these generally conventional elements be shown in order to provide an enabling disclosure. As illustrated, the computing device 500 includes a processing unit 540, a network interface 545, a computer readable medium drive 550, an input/output device interface 555, a display 560, and an input device 565, all of which may communicate with one another by way of a communication bus. The network interface 545 may provide connectivity to one or more networks or computing systems. The processing unit 540 may thus receive information and instructions from other computing systems or services via a network. The processing unit 540 may also communicate to and from memory 570 and further provide output information for an optional display 560 via the input/output device interface 555. The input/output device interface 555 may also accept input from the optional input device 565, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 540 executes in order to implement one or more embodiments. The memory 570 generally includes RAM, ROM and/or other persistent, auxiliary or non-transitory computer-readable media. The memory 570 may store an operating system 572 that provides computer program instructions for use by the processing unit 540 in the general administration and operation of the computing device 500. The memory 570 may further include computer program instructions and other information for implementing aspects of the present disclosure.

For example, in one embodiment, the memory 570 includes a model learning module 424 that learns an incremental outcome prediction model using training data generated by a training data generation module 420. The memory 570 may additionally or alternatively include a prediction module 432 that generates a prediction result using prediction input data and the incremental outcome prediction model received from the prediction input data generation module 428 and the model learning module 424 respectively. In addition, memory 570 may include or communicate with training data store 416 and/or one or more other data stores that stores training data or retraining data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a memory;
   a data store configured to store a marketing campaign log; and
   a hardware processor in communication with the memory and configured to execute computer-executable instructions to at least:
   select a first log entry for a first user in the marketing campaign log, wherein the first log entry indicates that a first message of a first marketing campaign has been displayed to the first user, and wherein the first log entry comprises (a) a first probability of any message of the first marketing campaign being displayed to the first user with a first user context, (b) a first observed short term behavior of the first user, and (c) a first observed long term behavior of the first user;
   select a second log entry for a second user in the marketing campaign log, wherein the second log entry indicates that a second message of a second marketing campaign has been displayed to the second user, wherein the second log entry comprises (d) a second probability of any message of the second marketing campaign being displayed to the second user with a second user context, (e) a second observed short term behavior of the second user, and (f) a second observed long term behavior of the second user, wherein the first user context and the second user context are within a threshold distance in a context space comprising the first user context and the second user context, and wherein the first marketing campaign is different than the second marketing campaign;
   determine a difference between the first log entry and the second log entry, wherein the difference between the first log entry and the second log entry comprises (g) a difference between the first observed short term behavior of the first user and the second observed short term behavior of the second user, and (h) a difference between the first observed long term behavior of the first user and the second observed long term behavior of the second user;
   train a machine learning model to predict an incremental effect of individual marketing campaigns, wherein the machine learning model is trained based at least in part on the difference between the first log entry and the second log entry;
   provide information representing a third context of a third user as input to the machine learning model;
   determine, based at least in part on output of the machine learning model, an optimal campaign allocation for the third user, wherein the optimal campaign allocation for the third user comprises a probability distribution of selection criteria for a plurality of marketing campaigns, and wherein the plurality of marketing campaigns comprises the first marketing campaign and the second marketing campaign;
   select, based on the optimal campaign allocation for the third user, a third marketing campaign from among the plurality of marketing campaigns; and
   provide a third message of the third marketing campaign to a computing device associated with the third user.

2. The system of claim 1, wherein the first observed short term behavior of the first user comprises at least one of (a) an observed selection by the first user of a display of the first message of the first marketing campaign to the first user during a browsing session, (b) a short term transaction revenue from the first user within a short term time threshold of the first message of the first marketing campaign being displayed to the first user, or (c) the duration of the browsing session, and wherein the first observed long term behavior of the first user comprises a difference in revenue between the short term time threshold and a long term time threshold after the first message of the first marketing is displayed to the first user.

3. The system of claim 1, wherein at least one of the first observed short term behavior of the first user or the first observed long term behavior of the first user comprises a continuous behavior.

4. The system of claim 1, wherein at least one of the first observed short term behavior of the first user or the first observed long term behavior of the first user comprises a discrete behavior.

5. The system of claim 1, wherein the first user context of the first log entry comprises at least one of a user feature, a marketing channel, a user device type, a time, or a day.

6. A computer-implemented method comprising:
as implemented by one or more computing devices configured with specific executable instructions,
training a machine learning model to predict an incremental effect of individual marketing campaigns, wherein the machine learning model is trained at least in part on an observed difference between long term behaviors of a first user and a second user, wherein the first user and the second user each was presented with a message of a different marketing campaign selected from a plurality of marketing campaigns;
providing information regarding a third user as input to the machine learning model;
determining, based at least in part on output of the machine learning model, an optimal campaign allocation for the third user, wherein the optimal campaign allocation for the third user comprises a probability distribution of selection criteria for the plurality of marketing campaigns;
selecting, based on the optimal campaign allocation for the third user, a marketing campaign for the third user from among the plurality of marketing campaigns; and
providing a message of the third marketing campaign to a computing device associated with the third user.

7. The method of claim 6, wherein a long term behavior of the first user comprises an incremental transaction revenue, engagement, or conversion of the first user between a short term time threshold and a long term time threshold.

8. The method of claim 7, wherein the long term time threshold is within one month after the message of the first marketing campaign is displayed to the first user.

9. The method of claim 6, wherein the third user is the same as one of the first user or the second user.

10. The method of claim 6, wherein the third marketing campaign is the same as a marketing campaign presented to one of the first user or the second user.

11. The method of claim 6, wherein the plurality of marketing campaigns includes a null marketing campaign.

12. The method of claim 6, wherein the message of the third marketing campaign is related to an item of interest to the third user.

13. A system comprising:
a memory; and
a hardware processor in communication with the memory and configured to execute computer-executable instructions to at least:
receive a marketing campaign log comprising a first log entry for a first user, wherein the first log entry comprises a first observed short term behavior of the first user and a first observed long term behavior of the first user after the first user received a first message of a first marketing campaign;
select a second log entry for a second user in the marketing campaign log, wherein the second log entry comprises a second observed short term behavior of the second user and a second observed long term behavior of the second user after the second user received a second message of a second marketing campaign;
determine a first difference between the first observed short term behavior of the first user and the second observed short term behavior of the second user;
determine a second difference between the first observed long term behavior of the first user and the second observed long term behavior of the second user;
train a machine learning model to predict an incremental effect of individual marketing campaigns, wherein the machine learning model is trained based at least in part on the first difference and the second difference;
provide information regarding a third user as input to the machine learning model; and
select, based on output of the machine learning model, a third marketing campaign from which to provide a message to the third user.

14. The system of claim 13, wherein the hardware processor being configured to select the second log entry comprises the hardware processor being configured to select the second marketing campaign based on a nearest neighbor method, a locality sensitive hashing method, or a propensity matching method.

15. The system of claim 13, wherein the hardware processor being configured to train the machine learning model comprises the hardware processor being configured to:
determine that the difference between the first observed long term behavior of the first user and the second observed long term behavior of the second user is a biggest difference between the first observed long term behavior of the first user and any second observed long term behavior of the second user; and
learn a distribution of selection criteria based at least on the difference between the first observed long term behavior of the first user and the second observed long term behavior of the second user.

16. The system of claim 13, wherein the hardware processor is further configured to normalize the difference between the first observed long term behavior of the first user and the second observed long term behavior of the second user.

17. The system of claim 13, wherein the hardware processor is further configured to normalize the first observed long term behavior of the first user.

18. The system of claim 17, wherein the first log entry comprises a first probability of a message of the first marketing campaign being selected to be received by the first user, and wherein the hardware processor being configured to normalize the first observed long term behavior of the first user comprises the processor being configured to normalize the first observed long term behavior of the first user based on the first probability of the message of the first marketing campaign being selected to be received by the first user.

19. The system of claim 13, wherein the hardware processor is further configured to provide the machine learning model to a recommendation service.

20. The system of claim 19, wherein the recommendation service provides the third marketing campaign to an application, and wherein the application provides the message of the third marketing campaign to a computing device associated with the third user.

* * * * *